(12) United States Patent
Garcia et al.

(10) Patent No.: US 8,563,068 B2
(45) Date of Patent: Oct. 22, 2013

(54) ANTISPATTERING AGENT

(75) Inventors: Rita Esther Garcia, Bogota (CO); Guillermo Andres Viecco Castillo, Bogota (CO)

(73) Assignee: Team Foods Colombia S.A. (CO)

( * ) Notice: Subject to any disclaimer, the term of this patent is extended or adjusted under 35 U.S.C. 154(b) by 170 days.

(21) Appl. No.: 13/055,845

(22) PCT Filed: Jul. 25, 2008

(86) PCT No.: PCT/IB2008/001960
§ 371 (c)(1),
(2), (4) Date: Jan. 25, 2011

(87) PCT Pub. No.: WO2010/010416
PCT Pub. Date: Jan. 28, 2010

(65) Prior Publication Data
US 2011/0123701 A1    May 26, 2011

(51) Int. Cl.
*A23D 9/007*    (2006.01)
(52) U.S. Cl.
USPC .......................... 426/601; 426/423; 426/609
(58) Field of Classification Search
USPC ....................................................... 426/601
See application file for complete search history.

(56) References Cited

U.S. PATENT DOCUMENTS

| 3,415,659 A | | 12/1968 | Purves |
| 3,669,681 A | | 6/1972 | Shoaf et al. |
| 5,100,684 A | * | 3/1992 | El-Nokaly et al. ............ 426/438 |
| 5,192,572 A | * | 3/1993 | El-Nokaly et al. ............ 426/438 |
| 5,494,693 A | * | 2/1996 | Cooper .......................... 426/531 |
| 5,635,236 A | * | 6/1997 | Cooper .......................... 426/531 |

FOREIGN PATENT DOCUMENTS

| CA | 2077566 C | 3/1993 |
| EP | 0 013 053 B1 | 7/1980 |
| WO | 01/35756 A1 | 5/2001 |
| WO | 2005/058066 A1 | 6/2005 |

OTHER PUBLICATIONS

G. Marquez-Ruiz, et al; "Effectiveness of dimethylpolysiloxane during deep frying", Eur. J. Lipid Sci. Technol., 2004, vol. 106, abstract only.
International Search Report: PCT/IB2008/001960; mailed Dec. 16, 2009.

* cited by examiner

*Primary Examiner* — Carolyn Paden
(74) *Attorney, Agent, or Firm* — Barry J. Schindler; Greenberg Traurig, LLP

(57) ABSTRACT

The invention relates to an agent comprising vegetable oil, a hydrophilic colloidal metal oxide, a hydrophobic treated metal oxide and a mixture of polypropylene glycols, which, when added to pure edible fats or oils, provides same with a low spatter property when said oils and fats are used for the surface or deep frying of foods. Said antispattering agent does not alter the organoleptic properties or appearance of the oil or fat, such as smell, taste, color, transparency and stability at low temperatures, or produce any negative effects, such as the formation of scum during frying or the presence of particles.

15 Claims, 2 Drawing Sheets

FIGURE No. 1
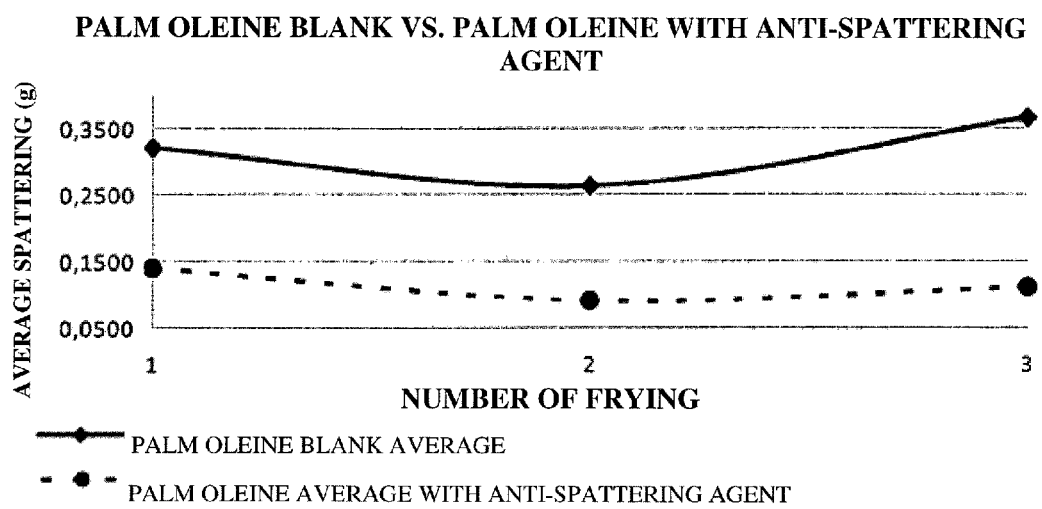

FIGURE No. 2
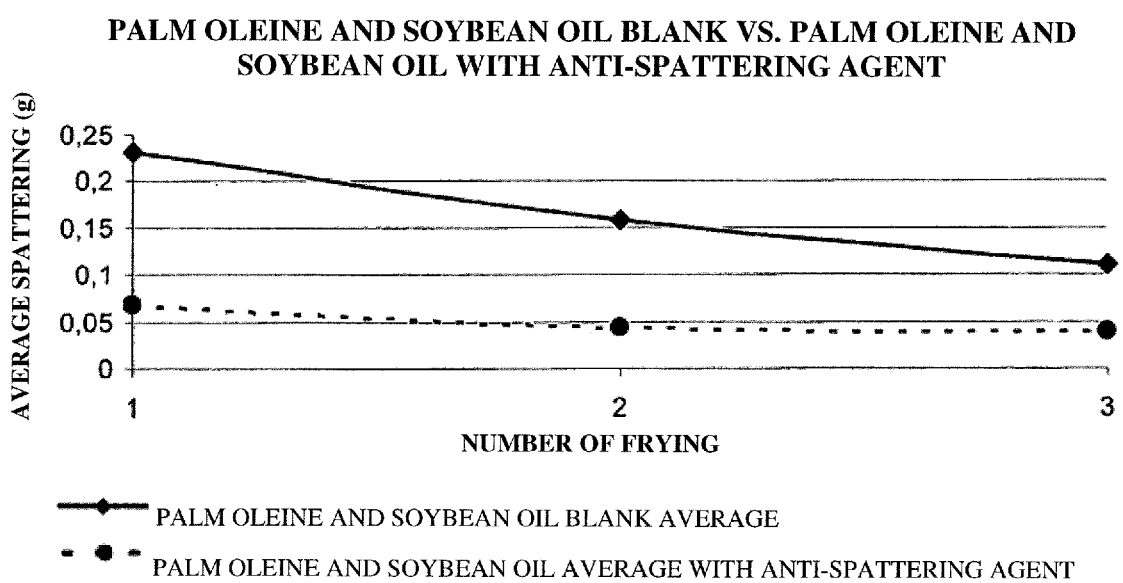

ANTISPATTERING AGENT

FIELD OF THE INVENTION

The present invention relates to an anti-spattering agent for use in edible oils or fats in food frying, which is able to alter the interfacial activity of oils.

Such modification allows reducing the amount of water that spatters when foods are fried.

BACKGROUND OF THE INVENTION

The frying process consists in placing a food in hot oil or fat at a temperature of 150-200° C. The oil acts a means through which heat is transferred to the fried product.

The frying process can be divided in two types: shallow frying and deep frying. With regard to the shallow frying, frying pans are generally used, where the level of oil used does not cover the food totally; thus, the food is fried over the surface in contact with the oil, and is cooked over the surface that does not touch the oil. On the contrary, in the deep frying, the food is totally submerged in the oil, so it is fried over the entire surface.

It is widely known how difficult is to handle foods at the moment of frying, since when those foods are introduced in the hot oil, the water contained in the food is instantaneously evaporated. Water evaporated carries oil and food particles, which may entail possible burns by the user, oil and food wastes, and soiling of the frying area.

The water contained in the food may come from the intrinsic humidity of the food or from the ambient humidity where the food has been stored. The water coming from the ambient may be in solid or liquid state, depending on whether the food has been refrigerated, frozen or stored at normal ambient conditions.

When the food is placed in the oil, the humidity related with the ambient is the first one that reacts and evaporates immediately. Vapor generated gets immediately in contact with the oil, causing both means to interact as a result of an interfacial force, which is relatively high as regards the conditions of this phenomenon. In this way, when the vapor column goes out, a certain amount of oil remains linked to the vapor, causing frying spattering.

In the case of the food intrinsic humidity, the water is evaporated slowly without causing significant frying spattering. This happens because the natural humidity of the food is slowly released from it, and in minimal amounts, and because the internal heating of the food is gradual and the water must travel a certain distance before its release.

In the state of the art, different types of anti-spattering agents for water-in-oil emulsions are distinguished (especially, for margarines and spreadable oils). Canadian patent CA 2077566 discloses an anti-spattering agent comprised of a mixture of partially oxidized soybean oil ("blown soybean oil") and a source of phosphatides and salt to be used in spreadable oils. This reference is focused on reducing both primary (characteristic of emulsions) and secondary spattering (characteristic of the food to be fried).

On the other hand, international publication WO 2005/058066 discloses a water-in-oil emulsion containing a porous vegetable material with an average particle size of 1-2000 μm and a reducing spattering effect when it is used as a frying means. This porous vegetable material derives from fruits, nuts, seeds and/or grinded cellulose.

Reference WO 01/35756 discloses an anti-spattering agent for water-in-oil fluid emulsions, which comprises a mixture of different anti-spattering emulsifier agents, such as hydrolyzed lecithin, fractioned lecithin, citric acid esters, and mixtures thereof.

European patent EP 0013053 discloses the process for the production of margarine with a tendency of reducing spattering by adding separately a phosphatide, and a metal hydrophilic oxide and/or slightly divided metal oxide, in the oily phase.

As it is noted from the above-mentioned examples, little is known about agents or mechanisms for reducing spattering during food frying, when non-emulsified oily products are used as frying means, that is, pure edible oils or fats.

An exception to this is U.S. Pat. No. 3,415,659, which discloses oil for use as a means in food frying with anti-spattering properties or for use as a dressing. Substances providing oils with anti-spattering properties include: ethoxylated unsaturated fatty acid polysorbate with about 20 moles ethylene oxide containing from about 0.125% to 0.3% of total composition of the oil, and about 0.05% to 0.20% polyglycerol polyester of unsaturated fatty acids. The fatty acid of both compounds contains about 14-18 units of carbon. Those compounds are used as emulsifiers in water-oil systems. The anti-spattering principle of this oil is precisely the emulsion produced between the water from food articles and the oil. This principle has several disadvantages. The first disadvantage is the restriction in the emulsifying system dosage, in that with doses higher than the ones described in this document, the oil loses one of its basic properties, such as transparency, causing evident turbidity when the oil is subject to temperatures lower than 30° C. after frying. Another disadvantage is the possible formation of scum during the frying process, particularly, when high starch foods are fried.

Surprisingly, the inventors of this anti-spattering agent found that the system formed by vegetable oil, a hydrophilic colloidal metal oxide, a hydrophobic treated metal oxide, and a mixture of propylene glycols, when added to pure edible oils or fats, provides same with a low spattering property if said oils and fats are used in shallow or deep frying.

The anti-spattering agent described in this invention does not alter the organoleptic properties or appearance of the oil or fat, such as smell, taste, color, transparency and stability at low temperatures, or produce any negative effects, such as the formation of scum during frying or the presence of particles.

BRIEF SUMMARY OF THE INVENTION

The present invention relates to an anti-spattering agent for use in edible oils or fats in food frying, which is able to alter the interfacial activity of oils among the gaseous phase (vapor), the liquid phase (oil) and the solid phase (food). In this way, water evaporated releases more easily from the oil, and the vapor column formed does not carry the same amount of oil than when the anti-spattering system is not present. Said anti-spattering agent does not alter the organoleptic properties or appearance of the oil or fat, such as smell, taste, color, transparency and stability at low temperatures, or produce any negative effects, such as the formation of scum during frying or the presence of particles.

BRIEF DESCRIPTION OF THE DRAWINGS

FIG. 1 shows the effect of the anti-spattering agent on the spattering of palm oleine.

FIG. 2 shows the effect of the anti-spattering agent on the spattering of a mixture of palm oleine and soybean oil.

DETAILED DESCRIPTION OF THE INVENTION

The anti-spattering agent described herein has a shallow tension lower than the edible oil or fat's tension, which makes its addition easier, and speeds up the spreading over the frying oil.

During the frying process, the anti-spattering agent can diminish oil-vapor and vapor-food interfaces, causing their breaking-off and facilitating the detachment of the vapor column; thus, the amount of oil and food particles dragged by is considerably reduced.

The anti-spattering agent for use in edible oils and fats for frying described herein comprises a mixture of vegetable oil, a hydrophilic colloidal metal oxide, a hydrophobic treated metal oxide, and a mixture of propylene glycols.

Vegetable oil may comprise soybean oil, palm oil, palm oleine, sunflower oil, canola oil, any other type of edible liquid oil or a mixture of thereof.

By hydrophilic colloidal metal oxides we mean those obtained by thermal decomposition of metals (vapor phase hydrolysis), such as aluminum oxide, silicon oxide, iron oxide, and even titanium and zirconium oxide.

Treated metal oxides are hydrophilic in nature, but when they are subject to a reaction with organic silicon groups, are turned into hydrophobic metal oxides. Examples of organic silicon groups are: chlorotrimethylsilane, dimethyldichlorosilane, nitrotrimethylsilane, chlorotriethylsilane, chlorodimethylsilane, n-propylchlorosilane, dimethylisopropylchlorosilane, tripopylchlorosilane, dimethyloctylchlorosilane, tributhylchlorosilane, -buthyldimethylchlorosilane, imethylethylchlorosilane, 3-chloropropyldimethylchlorosilane, chlorodimethoxymethylsilane, methylphenyl chlorosilane, triethoxychlorosilane, dimethylphenylchlorosilane, methylphenylvinylchlorosilane, benzyldimethylchlorosilane, diphenylchlorosilane, diphenylmethylchlorosilane, among others.

Polypropylene glycol is the polymer of oxypropylated polyester diol, whose molecular weights may range from 400 to 4000 unified atomic mass units (u).

In one embodiment of the invention, the anti-spattering components comprise about 90-99% vegetable oil; about 0.8-4.5% hydrophilic colloidal metal oxide; about 0.2-1.5% hydrophobic treated metal oxide. The mixture of polypropylene glycols has a nominal molecular weight ranging from 2000-4000 unified atomic mass units (u) and comprises about 0.01-0.6% of the concentration. Above-mentioned percentages refer to weight.

In a preferred embodiment of the invention, the vegetable oil has a concentration of about 93-99%; the hydrophilic colloidal metal oxide is the silicon oxide with a concentration of about 1.9-4.5%; the hydrophobic treated metal oxide is a silicon oxide treated with organic silicon groups with a concentration of about 0.6-1.5%; and the mixture of polypropylene glycols with a concentration of about 0.01-0.45%. Above-mentioned percentages refer to weight.

The efficiency of the anti-spattering agent described herein will be shown through the following examples:

Example 1

Preparing the Anti-Spattering Agent

The following formulation was used to prepare the antispattering agent:

94.9% palm oleine 3.6% colloidal silicon dioxide with a surface area of about 175-225 m²/g, and pH of about 3.7-4.7 measured in 4% water solution 1.2% dimethyl syloxane (with 98% silicon oxide) having a particle size of about 3-6 µm, and pH of about 9.3-11.3 measured in a 5% water-methanol solution 1:1

0.2% polypropylene glycol having a nominal molecular weight of 2000 unified atomic mass units (u), and a hydroxyl value of 56.8 mg KOH/g of sample 0.1% polypropylene glycol having a nominal molecular weight of 4000 unified atomic mass units (u), and a hydroxyl value of 28 mg KOH/g of sample The anti-spattering agent was prepared as follows:

Palm oleine was placed in a tank with stirring system, starting then a gentle stirring between 50-100 RPM. Afterwards, colloidal silicon dioxide was added slowly and stirring was increased by 500 RPM. The resulting mixture was stirred for 20 minutes, reducing stirring to 100 RPM after a while. Dimethyl syloxane was added slowly. Again, stifling was increased up to 500 RPM, for 30 minutes more. Then, the mixture of polypropylene glycols was added and stirred for one more hour, at 800 RPM. Temperature throughout the entire process was maintained between 28 and 30° C.

When final stirring finished, a sample was taken in order to verify its appearance. The sample did not show particles in suspension or oil separation, a fact that proves the sample's complete homogeneity.

The features of the byproduct include:

Density: 0.93 g/cm³ at 25° C.

Brookfield viscosity: 6500 cp. at 25° C. (using a needle No. 64 at 50 RPM, and a torque of about 50%)

Example 2

Preparing Frying Oil with the Anti-Spattering Agent Obtained in Example 1

0.06% of the anti-spattering agent obtained in example 1 was added to the palm oleine. The mixture was prepared at ambient temperature (28° C.), with constant stirring at about 200-300 RPM.

Example 3

Frying Tests Using the Oil Prepared in Example 2

The following test was standardized in order to assess the percentage of spattering reduction:

800 g oil were weighed in a 24 cm diameter by 8 cm high frying pan, and then heated in a heating plate until reaching 180°. 400 g pre-cooked and frozen potatoes were added (we selected this food because of its high content of starch and humidity, meaning that the experiment would be extreme). Oil spattering was cleaned using Kraft paper supported by a wooden ring of the same diameter than the frying pan's, which was directly placed upon the frying pan selvage. The paper had been weighed in advance, and stored in a dessicator.

After frying potatoes, the paper and drum were removed, and said paper was weighed again in a 4-digit, precision weighing analytical balance.

Table No. 1 shows the results obtained in the different spattering tests for the palm oleine with anti-scattering agent of example 2, and the palm oleine without said anti-scattering agent, which was used as a comparison blank.

TABLE NO. 1

| OIL | FRYING # | INITIAL PAPER WEIGHT (g) | POSTERIOR PAPER WEIGHT (g) | SPATTERING (g) | AVERAGE |
|---|---|---|---|---|---|
| PALM OLEINE BLANK | 1 | 3.8895 | 4.2761 | 0.3866 | 0.3202 |
|  | 2 | 3.4563 | 3.6135 | 0.1572 |  |
|  | 3 | 3.6348 | 4.0516 | 0.4168 |  |
| PALM OLEINE BLANK DUPLICATE | 1 | 3.6824 | 3.9358 | 0.2534 | 0.3112 |
|  | 2 | 3.9180 | 4.2842 | 0.3662 |  |
|  | 3 | 3.7554 | 4.0694 | 0.3140 |  |
| PALM OLEINE WITH ANTI-SPATTERING AGENT | 1 | 3.6832 | 3.8208 | 0.1376 | 0.1134 |
|  | 2 | 3.5203 | 3.6119 | 0.0916 |  |
|  | 3 | 3.5949 | 3.7058 | 0.1109 |  |
| PALM OLEINE WITH ANTI-SPATTERING AGENT DUPLICATE | 1 | 3.6845 | 3.8246 | 0.1401 | 0.1134 |
|  | 2 | 3.5378 | 3.6269 | 0.0891 |  |
|  | 3 | 3.6232 | 3.7343 | 0.1111 |  |

As shown in the table, three frying were made in duplicate for both the palm oleine used as blank and the palm oleine with anti-spattering agent.

Average results show a difference in the amount of average spattering, which are further explained in Table No. 2.

TABLE NO. 2

| OIL | SAMPLE | AVERAGE | AVERAGE | SPATTERING REDUCTION % |
|---|---|---|---|---|
| PALM OLEINE BLANK | FIRST BLANK | 0.3202 | 0.3157 |  |
|  | DUPLICATE | 0.3112 |  |  |
| PALM OLEINE WITH ANTI-SPATTERING AGENT | FIRST BLANK | 0.1134 | 0.1134 | 64.09% |
|  | DUPLICATE | 0.1134 |  |  |

Table No. 2 shows that spattering was reduced by 64.09% in the palm oleine with the anti-spattering agent versus the oleine used as blank.

FIG. 1 shows the spattering reduction considering the average data of each frying expressed in Table No. 1.

Example 4

Preparing Other Frying Oil with the Anti-Spattering Agent Obtained in Example 1

0.06% of the anti-spattering agent obtained in example 1 was added to the mixture of palm oleine and soybean oil. The mixture was made at ambient temperature (28° C.) with constant stirring between 200 and 300 RPM.

Example 5

Frying Tests Using the Oil Prepared in Example 4

Tables No. 3 and No. 4 and FIG. 2 show the results obtained in the different spattering tests for both the mixture of palm oleine and the soybean oil with the anti-spattering agent of example 4 and the mixture without said anti-spattering agent, which was used as a comparison blank.

TABLE NO. 3

| OIL | FRYING # | INITIAL PAPER WEIGHT (g) | POSTERIOR PAPER WEIGHT (g) | SPATTERING (g) | AVERAGE |
|---|---|---|---|---|---|
| PALM OLEINE AND SOYBEAN OIL BLANK | 1 | 4.1262 | 4.3066 | 0.1804 | 0.1830 |
|  | 2 | 3.8856 | 3.9840 | 0.0984 |  |
|  | 3 | 4.2438 | 4.5139 | 0.2701 |  |

TABLE NO. 3-continued

| OIL | FRYING # | INITIAL PAPER WEIGHT (g) | POSTERIOR PAPER WEIGHT (g) | SPATTERING (g) | AVERAGE |
|---|---|---|---|---|---|
| PALM OLEINE AND SOYBEAN OIL BLANK DUPLICATE | 1 | 3.4611 | 3.7454 | 0.2843 | 0.1846 |
|  | 2 | 3.4900 | 3.6479 | 0.1579 |  |
|  | 3 | 3.4415 | 3.5531 | 0.1116 |  |
| PALM OLEINE AND SOYBEAN OIL WITH ANTI-SPATTERING AGENT | 1 | 3.7444 | 3.8486 | 0.1042 | 0.0725 |
|  | 2 | 3.4662 | 3.5396 | 0.0734 |  |
|  | 3 | 3.8304 | 3.8702 | 0.0398 |  |
| PALM AND SOYBEAN OIL WITH ANTI-SPATTERING AGENT | 1 | 3.8366 | 3.8681 | 0.0315 | 0.0281 |
|  | 2 | 3.8388 | 3.8532 | 0.0144 |  |
|  | 3 | 3.7717 | 3.8100 | 0.0383 |  |

TABLE NO. 4

| OIL | SAMPLE | AVERAGE | AVERAGE | SPATTERING REDUCTION % |
|---|---|---|---|---|
| PALM OLEINE AND SOYBEAN OIL BLANK | FIRST BLANK DUPLICATE | 0.1830 0.1846 | 0.1838 |  |
| PALM OLEINE AND SOYBEAN OIL WITH ANTI-SPATTERING AGENT | FIRST BLANK DUPLICATE | 0.0725 0.0281 | 0.0503 | 72.65% |

As shown in the above table, there was a spattering reduction of 72.65% in the mixture of palm oleine and soybean oil with the anti-spattering agent as compared with the mixture used as blank.

Depending on the type of food and frying, spattering reduction percentages obtained in examples 3 and 5 may be higher or lower.

It will be evident for an expert in the art that several substitutions and modifications can be done in the invention described herein, without leaving the scope and nature of the invention far behind. This invention can be properly implemented in the absence of any element(s) or restriction(s) not specifically described herein. Terms and expressions have been used as terms and expressions of the description, and they are not intended to limit the invention in no way. However, we have to admit that the scope of the invention may be modified in several ways. Consequently, it should be understood that, although the present invention has been illustrated by means of specific embodiments and optional features, concepts described herein may be modified and altered by someone moderately knowledgeable about the subject. Such modifications and variations will be considered within the scope of this invention.

By virtue of the foregoing, the content of the following claims is declared as property:

What is claimed is:

1. A composition comprising a mixture of
   a sufficient first amount of vegetable oil,
   a sufficient second amount of hydrophilic colloidal metal oxide,
   a sufficient third amount of hydrophobic treated metal oxide and
   a sufficient fourth amount of a mixture of polypropylene glycols to form an anti-spattering agent,
   wherein, when the anti-spattering agent is added to palm oleine to form a mixture having 0.06 weight percent of the anti-spattering agent, a spattering of the mixture of palm oleine and anti-spattering agent is at least 60% less than a spattering of palm oleine, and wherein the spattering is calculated as follows:
   adding 800 grams of the mixture of palm oleine and anti-spattering agent or palm oleine to a 24 cm diameter by 8 cm deep frying pan;
   heating the frying pan to 180 degrees Celsius;
   adding 400 grams of pre-cooked and frozen potatoes to the frying pan;
   weighing a paper to determine a dry weight;
   adding the paper to a selvage of the frying pan;
   removing the paper from the selvage of the frying pan after the potatoes are fried;
   weighing the paper to determine a test weight; and
   calculating the spattering of the mixture of palm oleine and anti-spattering agent or the spattering of the palm oleine based on a difference between the paper test weight and the paper dry weight.

2. The composition of claim 1, wherein the vegetable oil comprises 90-99 wt %.

3. The composition of claim 1, wherein the hydrophilic colloidal metal oxide comprises 0.8-4.5 wt %.

4. The composition of claim 1, wherein the hydrophobic treated metal oxide comprises 0.2-1.5 wt %.

5. The composition of claim 1, wherein propylene glycols have a nominal molecular weight of 2000-4000 unified mass atomic units.

6. The composition of claim 1 or 5, wherein the mixture of propylene glycols comprises 0.01-0.6 wt %.

7. The composition of claim 1, wherein the vegetable oil comprises 93-99 wt %.

8. The composition of claim 1, wherein the hydrophilic colloidal metal oxide comprises a silicon oxide.

9. The composition of claim 1, wherein the hydrophilic colloidal metal oxide comprises 1.9-4.5 wt %.

10. The composition of claim 1, wherein the hydrophobic treated metal oxide comprises a silicon oxide treated with organic silicon groups.

11. The composition of claim 1, wherein the hydrophobic treated metal oxide comprises 0.6-1.5 wt %.

12. The composition of claim 1 or 5, wherein the mixture of polypropylene glycols comprises 0.01-0.45 wt %.

13. An edible oil or fat comprising 0.03-3% of the composition of claim 1.

14. An edible oil or fat comprising 0.06-1% of the composition of claim 1.

15. A composition comprising a mixture of 0.8-4.5 wt % of hydrophilic colloidal metal oxide, 0.2-1.5 wt % of hydrophobic treated metal oxide, 0.01-0.6 wt % of a mixture of polypropylene glycols, and a remainder of vegetable oil to form an anti-spattering agent.

* * * * *